United States Patent [19]
Toshima et al.

[11] Patent Number: 6,162,277
[45] Date of Patent: Dec. 19, 2000

[54] NICKEL FINE POWDER AND METHOD FOR PREPARING THE SAME

[75] Inventors: Yoshiharu Toshima; Takayuki Araki; Takao Hayashi, all of Yamaguchi; Hiroyuki Shimamura, Tokyo, all of Japan

[73] Assignee: Mitsui Mining and Smelting Co., Ltd., Tokyo, Japan

[21] Appl. No.: 09/240,629

[22] Filed: Feb. 1, 1999

[51] Int. Cl.⁷ .................................. B22F 1/00; B22F 9/00
[52] U.S. Cl. ................ 75/255; 75/343; 75/348; 75/370; 75/371; 75/374
[58] Field of Search .............................. 75/374, 348, 370, 75/343, 255, 371

[56] References Cited

U.S. PATENT DOCUMENTS 3,923,496 12/1975 Pall .
4,089,676 5/1978 Grundy .

FOREIGN PATENT DOCUMENTS 1 082 971 9/1967 United Kingdom .

*Primary Examiner*—Ngoclan Mai
*Attorney, Agent, or Firm*—Young & Thompson

[57] ABSTRACT

A nickel fine powder includes 0.02 to 1.0% by weight of magnesium and/or 0.02 to 0.1% by weight of calcium dispersed in the nickel. A method for preparing the nickel fine powder includes the steps of forming nickel hydroxide by mixing an aqueous solution containing a magnesium salt and/or a calcium salt and a nickel salt with an aqueous solution of sodium hydroxide and then reducing the hydroxide with a hydrazine reducing agent. The nickel fine powder has thermal shrinkage characteristics very close to those observed for ceramic substrates and is accordingly suitable as a material for producing an internal electrode for laminated ceramic condensers.

11 Claims, 1 Drawing Sheet

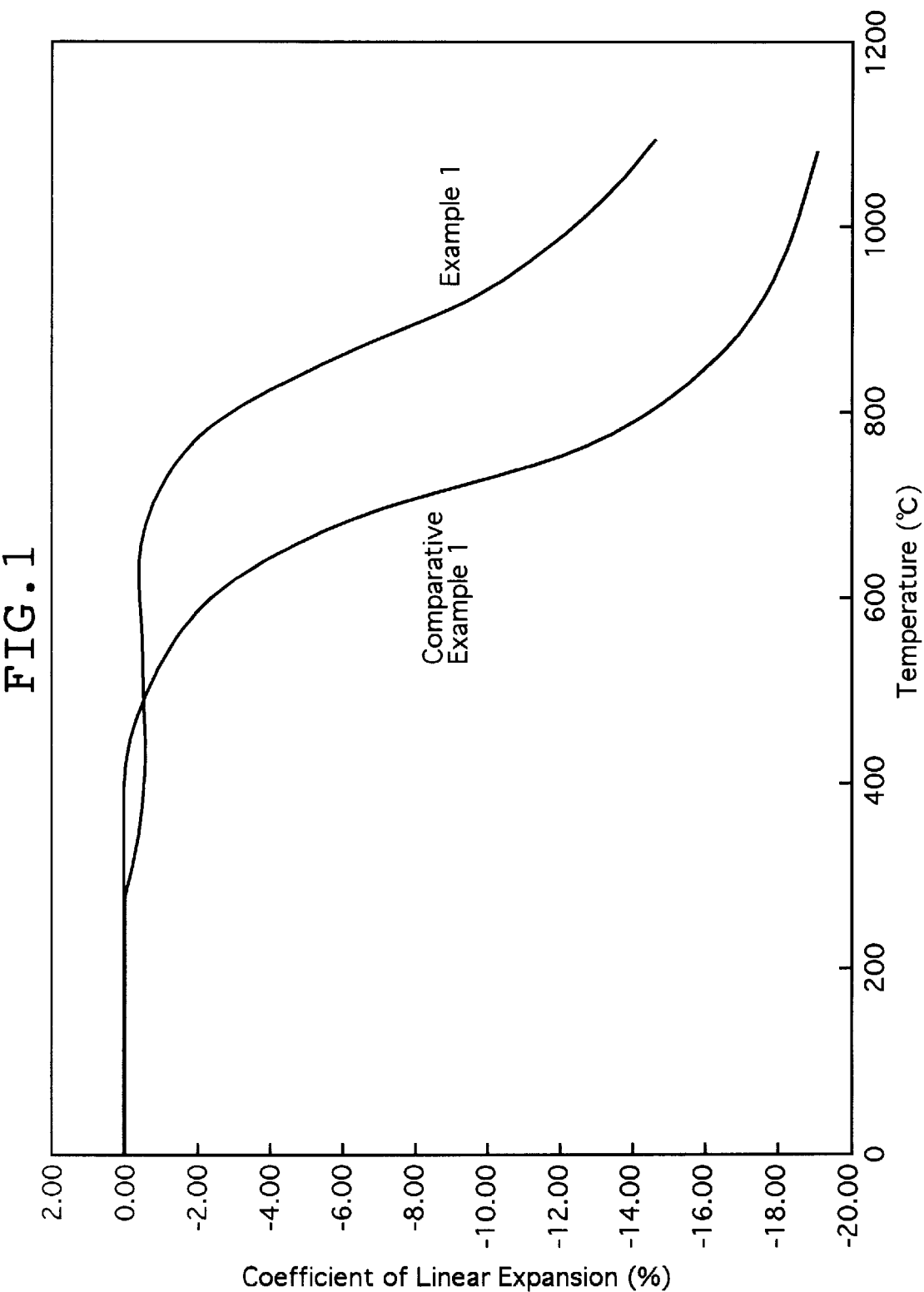

NICKEL FINE POWDER AND METHOD FOR PREPARING THE SAME

BACKGROUND OF THE INVENTION (a) Field of the Invention

The present invention relates to nickel fine powder which comprises nickel and specific amounts of magnesium and/or calcium dispersed therein as well as a method for preparing the nickel fine powder and more specifically to nickel fine powder which is suitable for use, in particular, as a material for the internal electrodes of laminated ceramic condensers and which is excellent in thermal shrinkage characteristics and a method for preparing the nickel fine powder.

(b) Prior Art

A laminated ceramic condenser is one obtained by alternatively putting ceramic dielectrics and internal electrodes on top of each other, attaching them by applying pressure and then firing the resulting laminate to thus unite these layers. There have been developed techniques wherein base metals such as nickel are substituted for noble metals such as platinum and palladium which have conventionally been used as materials for such internal electrodes and such techniques have gradually been advanced.

Up to now, there have been proposed a variety of methods for preparing such nickel powder. Although a dry method such as vapor phase hydrogen-reduction of nickel salt vapor may be listed as a typical example thereof, a wet method in which an aqueous solution containing a nickel salt is treated with a reducing agent under specific conditions to thus precipitate nickel has a variety of advantages including economical efficiency in view of energy cost required for the production of the nickel powder. Typical examples of such wet methods are those disclosed in, for instance, Japanese Un-Examined Patent Publication Nos. Hei 7-207307 and 7-278619. However, the thermal shrinkage characteristics of nickel fine powder prepared by any method differ from those observed for ceramic substrates, by nature. The thermal shrinkage characteristics of nickel fine powder also vary depending on the particle size of a particular product and when the primary particle size is on the order of 0.2 $\mu$m, nickel powder undergoes rapid thermal shrinkage at a temperature of not less than about 400° C., while if it is on the order of 0.5 $\mu$m, such rapid thermal shrinkage takes place at a temperature of not less than about 500° C.

Ceramic substrates can roughly be divided into the following three groups depending on their thermal shrinkage characteristics, according to OKAZAKI Kiyoshi (see "Ceramic Dielectrics Engineerings", 1978, pp. 135–137, published by Gakuken Sha):

(i) Those which once undergo thermal expansion and are then sintered while proceeding thermal shrinkage, when the temperature rises;
(ii) Those which are sintered while monotonously undergoing thermal shrinkage;
(iii) Those which are free of any monotonous thermal shrinkage, but whose rate of thermal shrinkage stepwisely varies in the course of the heating or the temperature rise.

In any case, however, it has been proved that the thermal shrinkage of the ceramic substrates takes place at a temperature of not less than 700° C. and it has also been known that some of ceramic substrates cause thermal expansion at a temperature of less than 700° C.

An internal electrode for laminated ceramic condensers has in general been prepared by forming a paste of nickel fine powder as a material therefor, printing the resulting paste on a ceramic substrate, putting a plurality of the printed substrates on top of each other, attaching these substrate to one another by applying pressure and heat and then firing the resulting laminate by heating in a reducing atmosphere.

If the nickel fine powder present in the paste undergoes rapid thermal shrinkage at a temperature in the neighborhood of 400 to 500° C. as has been discussed above, however, various defects such as delamination and crack-formation are frequently observed during firing because of difference in the thermal shrinkage characteristics between the ceramic substrate and the nickel fine powder as a material for internal electrodes and this has become a serious problem. To eliminate these defects, the following measures have been devised:

(i) Use of nickel fine powder whose particle size is on the order of 0.1 to 1 $\mu$m, which has high crystallizability and shows a low degree of thermal shrinkage;
(ii) Addition of a sintering retarder.

However, these measures have been, by themselves, limited in the level of improvement of the nickel fine powder in the thermal shrinkage characteristics.

As has been described above, the thermal shrinkage characteristics of the nickel fine powder are different from those observed for the ceramic substrates even if the nickel powder is prepared by any known method such as those described above and accordingly, there has been desired for the development of a technique capable of producing nickel fine powder which is improved so that it has thermal shrinkage characteristics almost identical to those of the ceramic substrates.

SUMMARY OF THE INVENTION

An object of the present invention is accordingly to provide nickel fine powder suitably used as a material for preparing an internal electrode for laminated ceramic condensers, i.e., nickel fine powder having thermal shrinkage characteristics almost identical to those of ceramic substrates and more specifically to provide nickel fine powder having a thermal shrinkage-initiating temperature in the neighborhood of 600 to 700° C. and whose thermochemical analysis (TMA) curve is similar to the TMA curves of ceramic substrates as well as a method for preparing the nickel fine powder.

The inventors of this invention have conducted various studies to accomplish the foregoing object, have found that the intended nickel fine powder having desired thermal shrinkage characteristics can be prepared by incorporating a specific amount of magnesium and/or calcium into nickel and that such nickel fine powder can be obtained by forming a hydroxide by mixing an aqueous solution containing a magnesium salt and/or a calcium salt and a nickel salt with an aqueous solution of sodium hydroxide and then reducing the hydroxide with a specific reducing agent and thus have completed the present invention.

According to an aspect of the present invention, there is provided nickel fine powder which comprises nickel and, on the basis of the total weight of the nickel fine powder, 0.02 to 1.0% by weight of magnesium and/or 0.02 to 0.1% by weight of calcium dispersed in the nickel.

According to another aspect of the present invention, there is also provided a method for preparing nickel fine powder which comprises the steps of forming a hydroxide by mixing an aqueous solution containing a magnesium salt and/or a calcium salt and a nickel salt with an aqueous solution of sodium hydroxide and then reducing the hydroxide with a hydrazine reducing agent to thus give nickel fine powder which comprises nickel and, on the basis of the total weight of the nickel fine powder, 0.02 to 1.0% by weight of magnesium and/or 0.02 to 0.1% by weight of calcium.

BRIEF DESCRIPTION OF THE DRAWING

FIG. 1 is a graph showing TMA curves observed for the nickel fine powder prepared in Example 1 and Comparative Example 1.

DESCRIPTION OF THE PREFERRED EMBODIMENTS

The nickel fine powder of the present invention comprises nickel and either or both of magnesium and calcium dispersed in the nickel and these magnesium and/or calcium permit the improvement of nickel fine powder in the thermal shrinkage characteristics. The content of magnesium required for the improvement of the thermal shrinkage characteristics of the resulting nickel fine powder ranges from 0.02 to 1.0%, preferably 0.1 to 0.8% by weight and more preferably 0.2 to 0.6% by weight based on the total weight of the fine powder. On the other hand, that of calcium required for the improvement of the thermal shrinkage characteristics of the resulting nickel fine powder ranges from 0.02 to 0.1%, preferably 0.02 to 0.08% by weight and more preferably 0.04 to 0.06% by weight based on the total weight of the fine powder.

This is because if the content of magnesium is 0 to 0.02% by weight and that of calcium is 0 to 0.02% by weight, the thermal shrinkage characteristics of the resulting nickel fine powder is not sufficiently improved. On the other hand, if using an aqueous solution containing a magnesium salt and/or a calcium salt and a nickel salt in such a mixing ratio that the content of magnesium present in the final product exceeds 1.0% by weight or that of calcium exceeds 0.1% by weight when preparing nickel fine powder comprising nickel and either or both of magnesium and calcium dispersed therein, the excess of these elements has a tendency to inhibit the reducing reaction of the resulting nickel hydroxide. Accordingly, the present invention is limited to nickel fine powder which comprises nickel and magnesium and/or calcium dispersed therein in contents ranging from 0.02 to 1.0% by weight and 0.02 to 0.1% by weight, respectively.

Moreover, the nickel fine powder of the present invention is mainly suitably used as, for instance, a material for preparing internal electrodes for laminated ceramic condensers and therefore, the averaged primary particle size preferably ranges from about 0.05 to about 1.2 $\mu$m, more preferably about 0.1 to about 0.8 $\mu$m and most preferably about 0.1 to about 0.6 $\mu$m.

Examples of nickel salts used in the method of the present invention include nickel sulfate, nickel halides and nickel nitrate. Examples of magnesium salts usable in the method of the invention are magnesium sulfate, magnesium chloride and magnesium nitrate and examples of calcium salts are calcium chloride, calcium bromide and calcium nitrate. These salts and sodium hydroxide used in the method of the invention are preferably highly pure ones such as special grade chemicals or first class grade chemicals as specified in JIS Specification. The use of these raw materials of low grade has a tendency to increase the particle size of the resulting nickel fine powder and the amount of scatter in the particle size distribution thereof, due to the influence of impurities included in these raw materials.

In the aqueous solution containing a magnesium salt and/or a calcium salt and a nickel salt used in the method of the invention, the aqueous solution should comprise these components in such a mixing ratio that the final product prepared by the method comprises nickel and, on the basis of the total weight of the nickel fine powder, 0.02 to 1.0% by weight of magnesium and/or 0.02 to 0.1% by weight of calcium. In addition, such an aqueous solution can be prepared by, for instance, a method in which predetermined amounts of these salts are simultaneously or in order added to and dissolved in water; a method in which aqueous solutions each containing one of these salts are separately prepared in advance and then mixing, in order, predetermined amounts of these aqueous solutions; or a method which comprises preparing an aqueous solution containing either of these salts and then simultaneously or in order adding predetermined amounts of the remaining salts to the solution to thus dissolve the latter.

When mixing the aqueous solution containing a magnesium salt and/or a calcium salt and a nickel salt with an aqueous solution of sodium hydroxide in the method of the invention, these aqueous solutions may be mixed together at a time, but preferably either of these aqueous solutions is gradually added to the other aqueous solution. For instance, it is preferred to gradually add the aqueous solution containing a magnesium salt and/or a calcium salt and a nickel salt to the aqueous solution of sodium hydroxide over 5 to 60 minutes to obtain a mixture and to thus form a hydroxide. If the rate of addition is high or the addition operation is completed within a time of less than 5 minutes, the viscosity of the reaction solution markedly increases and this has a tendency to interfere with the subsequent reducing reaction of the resulting nickel hydroxide. Contrary to this, if the rate of addition is low, i.e., the addition operation is continued over a time of more than 60 minutes, this does not adversely affect the reaction products and the resulting reaction solution, but this process is not efficient from the viewpoint of productivity since it takes a long time period for the addition operation.

In the method of the invention, the hydrazine reducing agent is added at a time or gradually to the reaction system while maintaining the temperature of the system to 55 to 80° C. depending on the desired particle size of the final product ranging from 0.05 to 1.2 $\mu$m to thus reduce the resulting hydroxide. More specifically, the particle size of the nickel fine powder comprising nickel and magnesium and/or calcium dispersed therein varies as a function of the rate of addition of the hydrazine reducing agent. For instance, if the hydrazine reducing agent is added to the reaction system at a time, the resulting product is liable to have a particle size on the order of about 0.2 μm, while if it is continuously added to the system over 20 minutes, the resulting product is liable to have a particle size on the order of about 0.5 μm. Examples of the hydrazine reducing agents used herein are hydrazine, hydrazine hydrate, hydrazine sulfate, hydrazine carbonate and hydrazine chloride.

In addition, the use of the reducing reaction temperature of less than 55° C. would interfere with the progress of the reducing reaction and accordingly, the resulting product is liable to have a large scatter in the primary particle size. On the other hand, the use of a temperature of higher than 80° C. is less economical since the increase in the cost required for heating operations cannot be compensated by the effect expected.

The present invention will hereinafter be described in more detail with reference to the following Examples and Comparative Examples, but the present invention is not restricted to these specific Examples at all.

EXAMPLE 1

Sodium hydroxide (244 g) having a purity corresponding to that specified in JIS K8576 was dissolved in pure water and followed by supplementing the resulting solution with pure water so that the total volume of the solution was equal to 430 ml. On the other hand, 448 g of nickel sulfate hexahydrate having a purity corresponding to that specified in JIS K8989 was dissolved in pure water (warmed water was used for ensuring fast and complete dissolution thereof), followed by supplementing the solution with pure water so that the total volume of the resulting solution was equal to 1000 ml, addition of 2.38 g of magnesium sulfate heptahydrate having a purity corresponding to that specified in JIS K8995 and 0.78 g of anhydrous calcium chloride having a purity corresponding to that specified in JIS K8123 and dissolution of these components with stirring.

The foregoing aqueous solution containing nickel sulfate, magnesium sulfate and calcium chloride was continuously added to the foregoing aqueous solution of sodium hydroxide at a rate of addition of 20 ml/min over 50 minutes.

The hydroxide-containing slurry thus prepared was heated to a temperature of 60° C. and then 420 g of hydrazine monohydrate was added thereto over 20 minutes to reduce the hydroxide.

The nickel fine particles thus prepared, which comprised nickel and magnesium and calcium dispersed in the nickel were continuously washed with pure water till the pH of the wash liquid reached to a level of not more than 10, followed by filtration according to the usual method and drying to give nickel fine powder.

The resulting nickel fine powder was inspected for the contents of magnesium and calcium present therein, a Feret diameter (i.e., average particle size of primary particles) was determined by observing the electron micrograph thereof and the TMA curve was determined in a nitrogen gas atmosphere, at a rate of temperature rise of 10° C./min using a thermal mechanical analysis device (TAS-100 available from Rigakudenki Kogyo Co., Ltd.). The results of these measurements are summarized in the following Table 1. Incidentally, the results of the TMA curve determination is shown in FIG. 1.

EXAMPLE 2

The procedures used in Example 1 were repeated except that the added amount of the magnesium sulfate heptahydrate was changed to 5.95 g and that the addition of anhydrous calcium chloride was omitted to thus form nickel fine powder. The resulting nickel fine powder was subjected to the determination of the average particle size, contents of elements and TMA curve according to the same methods used in Example 1. The results thus obtained are summarized in Table 1.

EXAMPLE 3

The procedures used in Example 1 were repeated except that the added amount of the magnesium sulfate heptahydrate was changed to 0.40 g and that the addition of anhydrous calcium chloride was omitted to thus form nickel fine powder. The resulting nickel fine powder was subjected to the determination of the average particle size, contents of elements and TMA curve according to the same methods used in Example 1. The results thus obtained are summarized in Table 1.

EXAMPLE 4

The procedures used in Example 1 were repeated except that the added amount of the anhydrous calcium chloride was changed to 0.97 g and that the addition of magnesium sulfate heptahydrate was omitted to thus form nickel fine powder. The resulting nickel fine powder was subjected to the determination of the average particle size, contents of elements and TMA curve according to the same methods used in Example 1. The results thus obtained are summarized in Table 1.

EXAMPLE 5

The procedures used in Example 1 were repeated except that the added amount of the anhydrous calcium chloride was changed to 0.50 g and that the addition of magnesium sulfate heptahydrate was omitted to thus form nickel fine powder. The resulting nickel fine powder was subjected to the determination of the average particle size, contents of elements and TMA curve according to the same methods used in Example 1. The results thus obtained are summarized in Table 1.

Comparative Example 1

The procedures used in Example 1 were repeated except that both anhydrous calcium chloride and magnesium sulfate heptahydrate were not added at all to thus form nickel fine powder. The resulting nickel fine powder was subjected to the determination of the average particle size, contents of elements and TMA curve according to the same methods used in Example 1. The results thus obtained are summarized in Table 1. Incidentally, the results of the TMA curve determination is shown in FIG. 1.

Comparative Example 2

The procedures used in Example 1 were repeated except that the added amount of the magnesium sulfate heptahydrate was changed to 0.25 g and that any anhydrous calcium chloride was not added at all to thus form nickel fine powder.

The resulting nickel fine powder was subjected to the determination of the average particle size, contents of elements and TMA curve according to the same methods used in Example 1. The results thus obtained are summarized in Table 1.

about 700° C. and shows a TMA curve quite similar to that of the ceramic substrate. Consequently, the nickel fine powder of the present invention is quite suitable for use as a material for the internal electrode of laminated ceramic condensers.

TABLE 1

| Ex. No. | Av. Part. Size (μm) | Elem. Anal. Value (%) | | Coefficient of Linear Expansion (%) | | | | |
|---|---|---|---|---|---|---|---|---|
| | | Mg | Ca | 200° C. | 400° C. | 600° C. | 800° C. | 1000° C. |
| 1 | 0.50 | 0.214 | 0.041 | 0 | −0.85 | −0.85 | −4.77 | −13.54 |
| 2 | 0.50 | 0.489 | tr | 0 | −0.63 | −0.72 | −5.25 | −12.66 |
| 3 | 0.50 | 0.025 | tr | 0 | −0.56 | −2.89 | −8.43 | −15.00 |
| 4 | 0.50 | 0.001 | 0.055 | 0 | −0.98 | −1.11 | −6.54 | −14.08 |
| 5 | 0.50 | 0.002 | 0.024 | 0 | −0.67 | −3.05 | −9.08 | −14.74 |
| 1 * | 0.50 | 0.002 | tr | 0 | −0.46 | −6.31 | −14.15 | −16.62 |
| 2 * | 0.50 | 0.008 | tr | 0 | −0.33 | −5.94 | −14.96 | −15.98 |

* : Comparative Example; "tr" means "trace amount".

As will be seen from the data listed in Table 1, the coefficients of linear expansion of the nickel fine powder prepared in Comparative Examples 1 and 2 are rapidly changed (constricted) from about −6% to about −15% on the average at a temperature between 600 to 800° C., while those of nickel fine powder prepared in Examples 1 to 5 according to the present invention are only slightly changed from about −2% to about −7% on the average at a temperature between 600 to 800° C. This clearly indicates that the thermal shrinkage quite slowly proceeds in the products of the present invention.

Moreover, as will be seen from FIG. 1, the coefficient of linear expansion of the nickel fine powder prepared in Comparative Example 1 undergoes an rapid change (shrinkage) which is initiated in the neighborhood of about 500° C., while the ceramic substrate causes only a quite slight change in the neighborhood of that temperature and conversely sometimes causes thermal expansion. For this reason, if the nickel fine powder prepared in Comparative Example 1 is used as a material for preparing an internal electrode for laminated ceramic condensers, the resulting electrode is liable to cause delamination and/or crack-formation.

On the other hand, in the nickel fine powder prepared in Example 1 according to the present invention, the thermal shrinkage is initiated at an instance when the temperature thereof exceeds 700° C. which is very close to the thermal shrinkage-initiation temperature of the ceramic substrate. Therefore, the nickel fine powder prepared in Example 1 can effectively be used as a material for preparing an internal electrode for laminated ceramic condensers without causing any drawbacks such as delamination and/or crack-formation.

As will be clear from the foregoing, the nickel fine powder of the present invention does not undergo any rapid thermal shrinkage at a temperature in the neighborhood of 400 to 500° C. at which the conventional nickel fine powder causes rapid thermal shrinkage and the thermal shrinkage-initiation temperature thereof is shifted to a higher temperature side, i.e., to the temperature range of from about 600 to

What is claimed is:

1. Nickel fine powder comprising nickel and, on the basis of the total weight of the nickel fine powder, 0.02 to 0.1% by weight of calcium dispersed in the nickel.

2. The nickel fine powder as set forth in claim 1, comprising 0.04 to 0.06% by weight of calcium dispersed in the nickel.

3. The nickel fine powder as set forth in claim 1 wherein the fine powder has an average primary particle size ranging from 0.05 to 1.2 μm.

4. A method for preparing nickel fine powder comprising the steps of forming a hydroxide by mixing an aqueous solution containing a magnesium salt and/or a calcium salt and a nickel salt with an aqueous solution of sodium hydroxide and then reducing the hydroxide with a hydrazine reducing agent to thus give nickel fine powder which comprises nickel and, on the basis of the total weight of the nickel fine powder, 0.02 to 1.0% by weight of magnesium and/or 0.02 to 0.1% by weight of calcium dispersed in the nickel.

5. The method as set forth in claim 4 wherein the aqueous solution containing a magnesium salt and/or a calcium salt and a nickel salt is gradually added to the aqueous solution of sodium hydroxide over 5 to 60 minutes to obtain a mixture and to thus form a hydroxide and wherein the hydrazine reducing agent is added at a time or gradually to the reaction system while maintaining the temperature of the system to 55 to 80° C. to thus reduce the resulting hydroxide.

6. The method as set forth in claim 4 wherein the fine powder produced has an average primary particle size ranging from 0.05 to 1.2 μm.

7. A laminated ceramic condenser having an internal electrode comprising the nickel fine powder of claim 1.

8. A laminated ceramic condenser having an internal electrode comprising a nickel fine powder which comprises nickel and, on the basis of the total weight of the nickel fine powder, 0.02 to 1.0% by weight of magnesium and/or 0.02 to 0.1% by weight of calcium dispersed in the nickel.

9. The condenser of claim 8, wherein the nickel fine powder comprises 0.02 to 0.1% by weight of the calcium.

10. The nickel fine powder as set forth in claim 1, further comprising 0.02 to 1.0% by weight of magnesium dispersed in the nickel.

11. The nickel fine powder as set forth in claim 10, wherein the fine powder has an average primary particle size ranging from 0.05 to 1.2 $\mu$m.

* * * * *